(12) United States Patent
Combs

(10) Patent No.: US 12,083,716 B2
(45) Date of Patent: Sep. 10, 2024

(54) CONVEYOR PROCESS FOR FORMING AN INSULATED REGISTER BOX

(71) Applicant: STERLING CUSTOM SHEET METAL, INC., Magnolia, TX (US)

(72) Inventor: Sterling Kidd Combs, Magnolia, TX (US)

( * ) Notice: Subject to any disclaimer, the term of this patent is extended or adjusted under 35 U.S.C. 154(b) by 862 days.

(21) Appl. No.: 17/171,638

(22) Filed: Feb. 9, 2021

(65) Prior Publication Data

US 2021/0260797 A1    Aug. 26, 2021

Related U.S. Application Data

(60) Continuation-in-part of application No. 16/036,059, filed on Jul. 16, 2018, now Pat. No. 11,060,756, which is a continuation-in-part of application No. 16/005,235, filed on Jun. 11, 2018, now Pat. No. 11,402,121, and a continuation-in-part of application No. 15/864,612, filed on Jan. 8, 2018, now Pat. No. 10,995,969, said application No. 16/005,235 is a continuation-in-part of application No. 15/703,436, filed on Sep. 13, 2017, now Pat. No. 10,648,695, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969, said application No. 15/864,612 is a division of application No. 14/668,079, filed on Mar. 25, 2015, now Pat. No. 9,951,969.

(51) Int. Cl.
  *B29C 44/02*  (2006.01)
  *B29C 33/72*  (2006.01)
  *B29C 44/36*  (2006.01)
  *B29C 44/56*  (2006.01)

(52) U.S. Cl.
  CPC .............. *B29C 44/02* (2013.01); *B29C 33/72* (2013.01); *B29C 44/367* (2013.01); *B29C 44/56* (2013.01)

(58) Field of Classification Search
  CPC .......................... B29C 44/02; F24F 13/0263
  See application file for complete search history.

(56) References Cited

U.S. PATENT DOCUMENTS

| | | |
|---|---|---|
| 3,985,158 A | 10/1976 | Felter |
| 4,735,235 A | 4/1988 | Anderson |
| 5,095,942 A | 3/1992 | Murphy |
| 5,219,403 A | 6/1993 | Murphy |
| 5,658,196 A | 8/1997 | Swaim |
| 5,749,190 A | 5/1998 | Williams |

(Continued)

*Primary Examiner* — Nahida Sultana
*Assistant Examiner* — Virak Nguon
(74) *Attorney, Agent, or Firm* — Egbert, McDaniel & Swartz, PLLC

(57) ABSTRACT

A process for forming an insulated register box having a body and a duct in which an expandable polymeric material is introduced into the interior of the body. The body is placed onto a support, a plug is positioned into an interior of the body such that the expandable polymeric material expands between the back wall of the body and the plurality of side panels and the plug, positioning the assembly between a pair of conveyors such that the pair of conveyors holds the assembly tightly sandwiched therebetween, and conveying the assembly to another position adjacent an opposite end of the pair of conveyors.

19 Claims, 9 Drawing Sheets

(56) References Cited

U.S. PATENT DOCUMENTS

| | | |
|---|---|---|
| 5,957,506 A | 9/1999 | Stepp |
| 2004/0130154 A1 | 7/2004 | Stepp |
| 2008/0014860 A1 | 1/2008 | Heitman |
| 2008/0045137 A1* | 2/2008 | Rosal .................. F24F 13/0263 454/292 |
| 2015/0204622 A1* | 7/2015 | Gray .................. F24F 13/0263 165/135 |

* cited by examiner

CONVEYOR PROCESS FOR FORMING AN INSULATED REGISTER BOX

CROSS-REFERENCE TO RELATED APPLICATIONS

The present application is a continuation-in-part of U.S. patent application Ser. No. 16/036,059, filed on Jul. 16, 2018 and entitled "Insulated Register Box and Process For Forming Such Insulated Register Box", presently pending. U.S. patent application Ser. No. 16/036,059 was a continuation-in-part of U.S. patent application Ser. No. 15/864,612, filed in Jan. 8, 2018, which is a divisional of U.S. patent application Ser. No. 14/668,079, filed Mar. 25, 2015 and entitled "Insulated Register Box", now U.S. Pat. No. 9,951,969. U.S. patent application Ser. No. 16/036,059 was also a continuation-in-part of U.S. patent application Ser. No. 16/005,235, filed on Jun. 11, 2018 and entitled "Insulated Register Box with the Boot Rail Adapter", presently pending. U.S. patent application Ser. No. 16/005,235 is a continuation-in-part of U.S. patent application Ser. No. 15/703,436, filed on Sep. 13, 2017, which issued as U.S. Pat. No. 10,648,695 on May 12, 2020 and entitled "Insulated Register Box with Boot Rail Adapter". U.S. patent application Ser. No. 15/703,436 is a continuation-in-part of U.S. patent application Ser. No. 15/439,454, filed Feb. 22, 2017 and entitled "Process for Forming an Insulated Register Box", which issued as U.S. Pat. No. 10,309,682 on Jun. 4, 2019 and entitled "Process For Forming an Insulated Register Box". U.S. patent application Ser. No. 15/439,454 was a continuation-in-part of U.S. patent application Ser. No. 14/668,079, filed on Mar. 25, 2015 and entitled "Insulated Register Box and Method for Forming an Insulated Register Box", which issued as U.S. Pat. No. 9,951,969 on Apr. 24, 2018.

BACKGROUND OF THE INVENTION

1. Field of the Invention

The present invention relates to ductwork for heating, ventilation and air-conditioning (HVAC) systems. More particularly, the present invention relates to the processes for forming register boxes as used in such systems. More particularly, the present invention relates to conveyor-style processes for forming such register boxes.

2. Description of Related Art Including Information Disclosed Under 37 CFR 1.97 And 37 CFR 1.98

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The present Applicant is the owner of several patents and patent application publications related to such register boxes and the processes for forming such register boxes. For example, U.S. Patent Application No. 2018/036,3942, published on Dec. 20, 2018 to the present Applicant, describes an insulated register box and process for forming the insulated register box. This register box has a body with a plurality of side walls arranged in a generally rectangular or square configuration and a plurality of flanges extending inwardly from the plurality of side walls. An expandable polymeric material is affixed to an inner side of each of the plurality of side wall such that the expandable polymeric material has a portion extending across one end of the body inwardly of the plurality of flanges. A sheet is positioned over the portion of the expandable polymeric material at one end of the body such that the sheet is interposed between the plurality of flanges and the portion of the expandable polymeric material. The expandable polymeric material and the sheet are cuttable so as to open to the interior of the register box.

U.S. Pat. No. 10,648,695, issued on May 12, 2020 to the present Applicant, describes a register box with a boot rail adapter that has an insulating material affixed within the register box, a guide rail affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

U.S. Pat. No. 10,309,682, issued on Jun. 4, 2019 to the present Applicant, teaches a process for insulating a register box in which the register box has a plurality of side panels arranged in a generally rectangular configuration and a duct opening through a wall that extends across the generally rectangular configuration. This process involves flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner then removed from the register box.

U.S. Patent Application Publication No. 2018/0320921, published on Nov. 8, 2018 to the present Applicant, teaches an insulated register box apparatus with a boot rail adapter which has an insulating material affixed within the register box, a rail affixed to a side panel of the register box, and a rail guide having a slot that receives a section of the rail therein. The rail guide is adapted to be affixed to a supporting surface. The rail is affixed at least one of the side panels of the register box. The rail is slidable relative to the rail guide. The register box has a plurality of side panels and a duct that opens to an interior of the plurality of side panels. The insulating material extends inwardly of the plurality of side panels.

U.S. Patent Application Publication No. 2018/0187919, published on Jul. 5, 2018 to the present Applicant, teaches an insulated register box for HVAC installations that has a body with a plurality of side panels arranged in a generally rectangular or square configuration and a wall extending across the rectangular configuration. A duct opens through the wall so as to communicate with an interior of the body. An expandable foamed polymeric material is affixed to an inner side of the side panels. The wall has a surface extending from the opening of the duct to the side panels. The expandable foamed polymeric material is affixed to the surface of the wall.

U.S. Pat. No. 9,951,969, issued on Apr. 24, 2018 to the present Applicant, describes an insulated register box and a method for forming such an insulated register box. The register box has a body with a plurality of side panels arranged in a generally rectangular or square configuration and a wall extending across the rectangular configuration. A duct opens through the wall so as to communicate with the interior of the body. An expandable foamed polymeric material is affixed to an inner side of the side panels. The wall has a surface extending from the opening of the duct to the side panels. The expandable foamed polymeric material is affixed to the surface of the wall.

With these prior patents and patent application publications, the process for forming the register box involved the use of a carousel-type of operation. In essence, the worker would place the assembly into a "Lazy Susan" type of carousel and rotate the carousel as the expandable polymeric material would dry or cure during the rotation of the carousel. This operation was excellent in practice, but the Applicant in these prior patents and patent application publications found that it was not well suited to high production volumes. It was also very labor-intensive. This operation involved a lot of manual manipulation that could result in potential injury to workers. Ultimately, a great deal of lifting was required in order to place plates, plugs and supports within each of the openings of the carousel. As a result, production was slow. The production of such register boxes was very much limited due to the efficiency of the particular worker at the carousel. These carousels also occupied a relatively large footprint within the factory. It was not adapted to efficiently allow for multiple carousels to be employed within the factory environment. If multiple carousels were employed, the workers associated with such carousels were significantly spaced from one another. As such, the use of a common foam gun or other appliances was somewhat limited. As such, a need developed so as to enhance the ability to produce large volumes of such insulated register boxes while reducing labor efforts required for such production.

It is an object of the present invention to provide a process for forming an insulated register box which allows the register boxes to be produced at a relatively high rate.

It is another object of the present invention to provide a process for forming an insulated register box which allows multiple systems to be in employed in a side-by-side relationship.

It is another object of the present invention to provide a process for forming an insulated register box that reduces the amount of labor required for the production of such insulated register boxes.

It is another object of the present invention to provide a process for forming an insulated register box which reduces the amount of effort by the worker in the production of such an insulated register box.

It is a further object of the present invention to provide a process for forming an insulated register box which allows the workers to work side-by-side within a relatively small footprint.

It is still a further object of the present invention to provide a process for forming an insulated register box which reduces the costs required in the production of such register boxes and reduces the amount of labor required for such production.

These and other objects and advantages of the present invention will become apparent from a reading of the attached specification and appended claims.

BRIEF SUMMARY OF THE INVENTION

The present invention is a process for forming an insulated register box in which the insulated register box has a body with a plurality of side panels and a back wall and has a duct extending through an opening in the back wall. The process includes the steps of: (1) introduce an expandable polymeric material into an interior of the body; (2) placing the body onto a support; (3) positioning a plug into the interior of the body such that the expandable polymeric material expands between the back wall and plurality of side panels and the plug; (4) positioning the plug, the body and the support between a pair of conveyors adjacent one end of the pair of conveyors such that the pair of conveyors holds the body and the duct and the expandable polymeric material tightly sandwich therebetween; (5) conveying the body, the duct, the expandable polymeric material and the support to another position adjacent an opposite end of the pair of conveyors; (6) removing the support, the duct, the body, the expandable polymeric material, and the plug from the pair of conveyors; and (7) separating the plug from the body and the expandable polymeric material.

The duct is welded to the back wall of the body such that the duct has a portion extending into the interior of the body. The step of introducing the expandable polymeric material includes introducing the expandable polymeric material into the interior of the body in a location between the portion of the duct at least one of the plurality of side panels. The step of introducing the expandable polymeric material further includes spraying the expandable polymeric material from a foam gun to the interior of the body. The foam gun is connected to a supply of the expandable polymeric material.

The support is a block having a hole formed at a top side thereof. The step of placing the body onto the support includes inserting the duct into the hole of the block. The back wall of the body resides on the top surface of the block.

A plastic sheet is positioned over the end of the body opposite the back wall. This plastic sheet will be interposed between the plug and the expandable polymeric material. In other words, when the plug is inserted into the interior of the body, the plastic material will wrap around the plug so as to be interposed between the exterior of the plug and the expandable polymeric material. The step of separating includes lifting the plastic sheet from the expandable polymeric material so as to define a cavity on the interior of the body. The cavity communicates with the interior of the duct.

After the plug is removed, the plug is placed on a top of one of the pair of conveyors such that the plug returns to the original end of the pair of conveyors. Also, the support can be placed onto the top of the uppermost conveyor of the pair of conveyors so that the support also returns to the original end of the pair of conveyors. Since the portion of such conveyor holding the insulated register box assembly thereagainst moves in one direction, inherently, the return direction will be at the top of such conveyor so as to allow these items to be returned to the worker at the origin or beginning of the pair of conveyors. The expandable polymeric material will cure as the support, the duct of the body move along the pair of conveyors to the opposite end of the pair of conveyors.

The duct, the body and the expandable polymeric material placed onto a cleaning conveyor so as to clean the expandable polymeric material appearing on an exterior of the duct.

This cleaning conveyor has a plurality of brushes supported thereon or adjacent thereto. The step of placing the duct further comprises placing the body onto the cleaning conveyor such that the duct extends upwardly and moves with the cleaning conveyor such that the duct and the body pass between the plurality of brushes. Each of the pair of conveyors will move in an identical speed. One pair of the plurality of brushes will clean the exterior surface of the duct. Another pair of the plurality of brushes will clean the exterior of the body of the duct.

In the present invention, the original steps 1-7 are repeated for another duct and body. Importantly, the repeated steps are staggered from original steps such that the ducts and bodies of this repeated step are staggered or offset from the ducts and bodies of the original process.

The duct is welded to the back wall of the body so as to fix a position of the duct in the back wall. The assembly of the body and the duct is lifted from of a pallet adjacent to one end of the pair of conveyors prior to introducing the expandable polymeric material. The plug is positioned against an end of the duct interior of the body. The duct and the body and the expandable polymeric material are removed from an end of the cleaning conveyor. The plurality of brushes are supported in a position in spaced relation to the top of the cleaning conveyor.

The step of conveying includes compressing an upper end of the plug and against the end of the body opposite the back wall so as to retain the expandable polymeric material within the interior of the body. The plug bears against the end of the duct so as to prevent the expandable polymeric material from entering the interior of the duct upon expansion.

In the present invention, the pair of conveyors are maintained within a housing. Forced air is extracted from the interior of the housing so as to remove any vapors that may occur within the housing. In particular, the housing includes a pair of openings directed to the uppermost conveyor. A vacuum is applied so as to draw any fumes or air from the surfaces of the upper conveyor. This facilitates curing or drying of the expandable polymeric material. Another portion of the housing is placed below the lowermost conveyor. Another vacuum is applied to the interior of this portion of the housing so as to remove any vapors that may appear on the lowermost conveyor.

A scraper is positioned adjacent to an end of each of the pair of conveyors. The scraper is removes any debris or foam that might reside on the lower surface of the uppermost conveyor or on the upper surface of the uppermost conveyor. The scraper will discharge unwanted materials downwardly into a collector or receptacle. The collector or receptacle can then auger-feed the foam and debris to a remote location.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
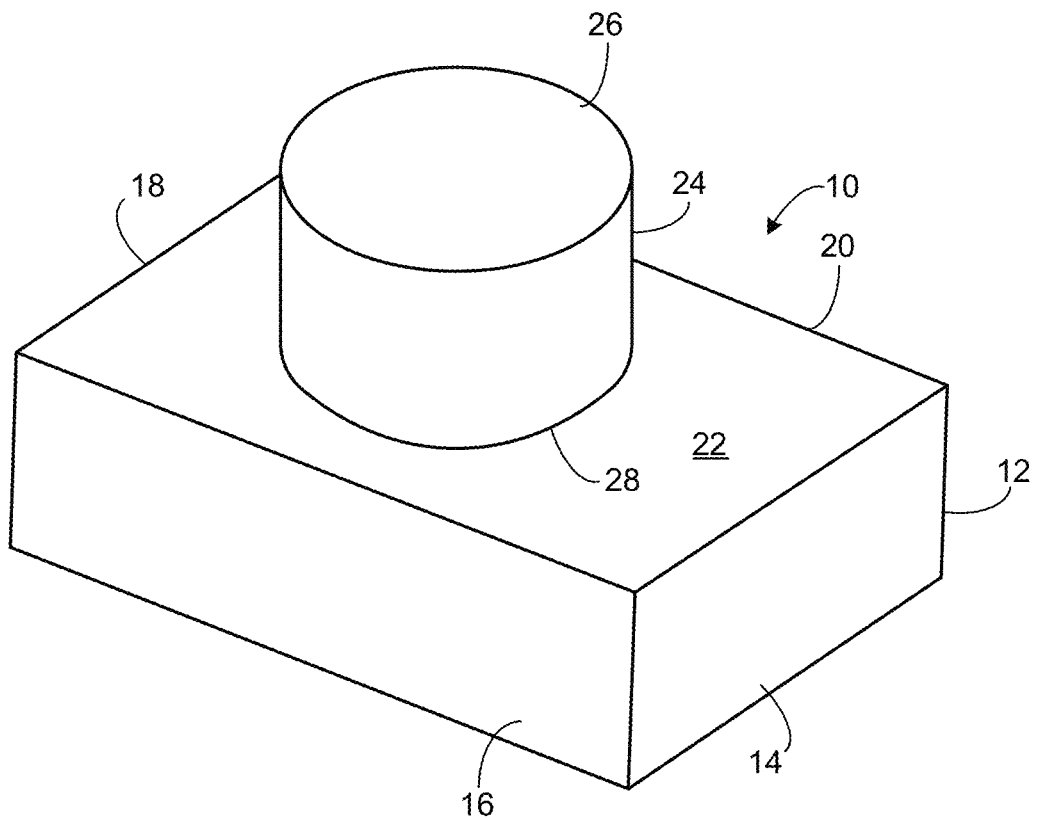
FIG. 1 is a perspective view of the insulated register box that is produced by the process of the present invention.

Referring to FIG. 1, there shown the insulated register box 10 as formed in accordance with the process of the present invention. The register box 10 includes a body 12 having side panels 14, 16, 18 and 20 formed into a generally rectangular configuration. A back wall 22 extends across this generally rectangular configuration. A duct 24 is illustrated as affixed to the wall 22 so as to open to the interior of the body 12. The duct 24 includes an open end 26 so as to allow duct 24 to be connected to the HVAC system of a building. Conventionally, the register box 10 will be formed and pieced together through the use of tack welding. Tack welding is a very efficient manner of forming the register box. In particular, the duct 24 can be tack welded to the body 22. As such, the duct 24 will have a portion that extends into the interior of the body 12 defined by the side panels 14, 16, 18 and 20.

Figure 2:
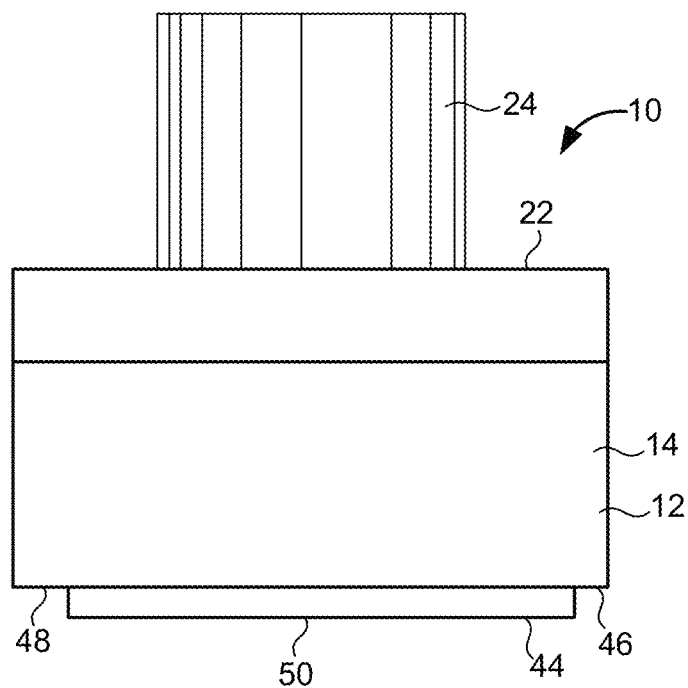
FIG. 2 is a side elevational view of the insulated register box produced by the process of the present invention.

FIG. 2 shows a side view of the register box 10. As can be seen in FIG. 2, the side panel 14 is particularly illustrated. The duct 24 is illustrated as affixed to an and extending outwardly of the back wall 22. It can be seen that there is a lip 44 that extends outwardly of the end 46 of the body 12. The lip 44, as will be described hereinafter, extends outwardly of a flange 48. Flange 48 extends inwardly from the side panels 14, 16, 18 and 20 such that the inner edge as defined in aperture 50 opens to the interior of the body 12.

Figure 3:
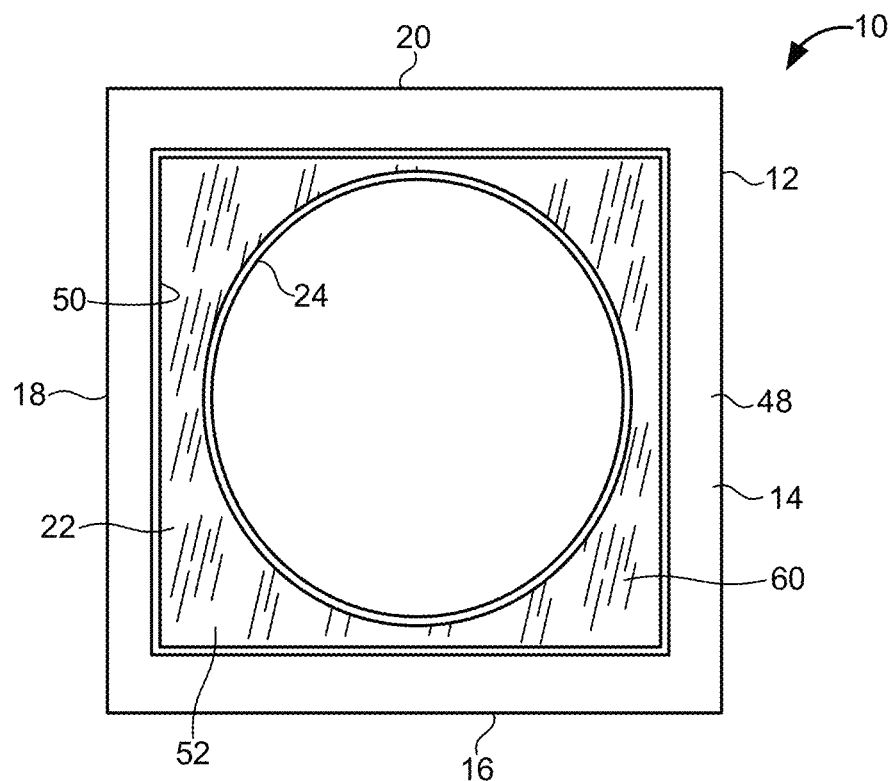
FIG. 3 is a plan view of the insulated register box produced as a result of the process of the present invention.

FIG. 3 is an end view of the register box of the present invention. In FIG. 3, it can be seen that the duct 24 is affixed to the back wall 22. Back wall 22 includes a surface 52 that extends from the opening of the duct 24 to the side panels 14, 16, 18 and 20 of the body 12. The expandable polymeric material 60 resides over the surface 52 and extends to the side panels 14, 16, 18 and 20. As such, the expandable polymeric material 60 effectively insulates the back wall 22 in the area adjacent to the opening of the duct 24.

FIG. 3 further shows the nature of the flanges 48. Flanges 48 has a particular width. In accordance with the present invention, the expandable polymeric materials 60 will reside against the side panels 14, 16, 18 and 20 and have a thickness approximately equal to the width of the flanges 48. The lip 50 is illustrated as extending in transverse relationship from the flange 48.

Figure 4:
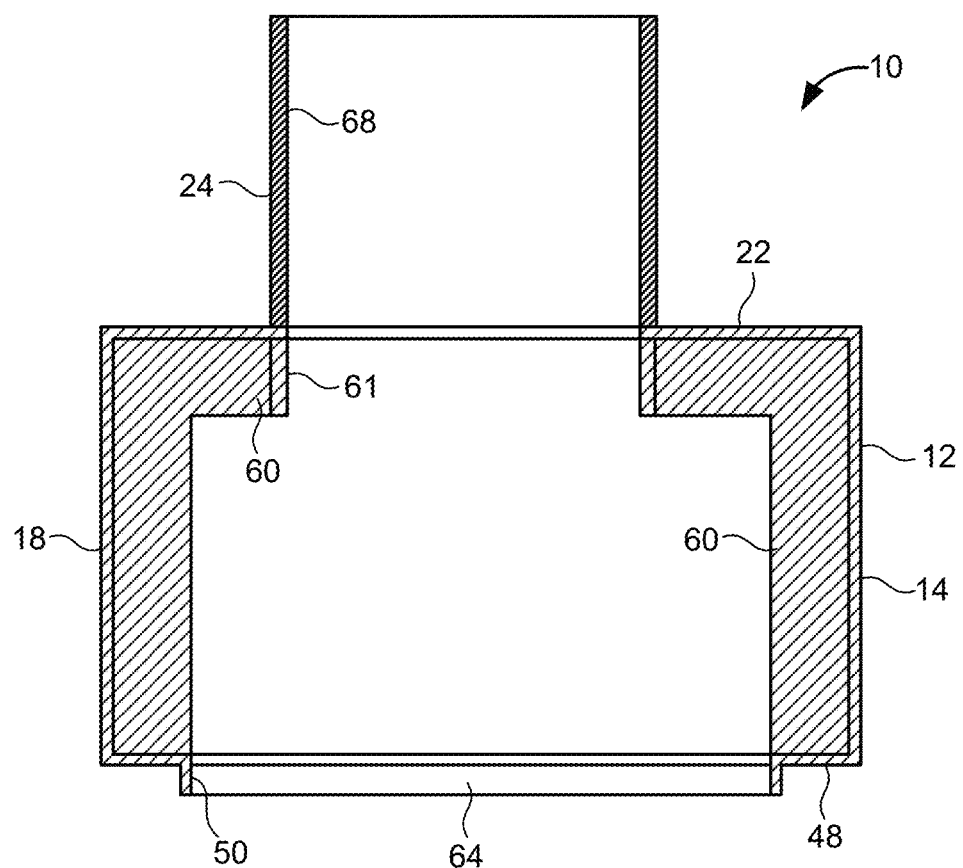
FIG. 4 is a cross-sectional view of the insulated register box is produced by the process of the present invention.

FIG. 4 is a cross-sectional view of the register box 10 of the present invention. As can be seen in FIG. 4, the expandable polymeric material 60 is illustrated as positioned against the side panels 14 and 18. A similar configuration will occur with respect to the side panels 16 and 20. The expandable polymeric material 60 is illustrated as having a thickness approximately equal to the width dimension of the flange 48. The flange 48, along with the lip 50, defines an aperture 64 that opens to the interior of the body 12. The expandable polymeric material 60 also has a portion that resides against the inner surface of the wall 22. This portion 60 extends from the side panels 14 and 18 so as to bear against the portion 61 of the duct 24 that extends into the interior of the body 12.

In this configuration, the expandable polymeric material 60 can serve as insulation. This insulation is compliant with national building codes, is fire resistant, and also avoids the use of fibrous insulation material. As such, this type of material, since it avoids the fibrous material in the assembly requirements, improves the health and safety of workers that assemble the register box 10. The insulation created by the expandable polymeric material 60 does not require any alterations in the structure of the body 12 or of the duct 24. The insulation material causes the register box 10 to be very energy-efficient.

In FIG. 4, it can be seen that there is no expandable polymeric material located on the inner wall 68 of the duct 24. If any expandable polymeric material would enter the duct 24 or reside on the inner wall 68 of the duct 24, and it could hamper air circulation. As such, it was felt that it was important to block any movement of the expandable polymeric material from entering the area of the interior of the duct 24. Since the expandable polymeric material 60 extends to the aperture that is defined by the lips 50 and the flanges 48, it does not interfere with air flow into the interior of the register box. The movement of the expandable polymeric material toward the interior of the duct 24 is blocked by the portion 61 of the duct 24. The blocking of the expansion of the expandable polymeric material into the interior of the duct will be further blocked by the process of the present invention, to be described hereinafter. As such, the present invention remains substantially aerodynamic while, at the same time, improving the insulating qualities required of the register box 10.

Figure 5:
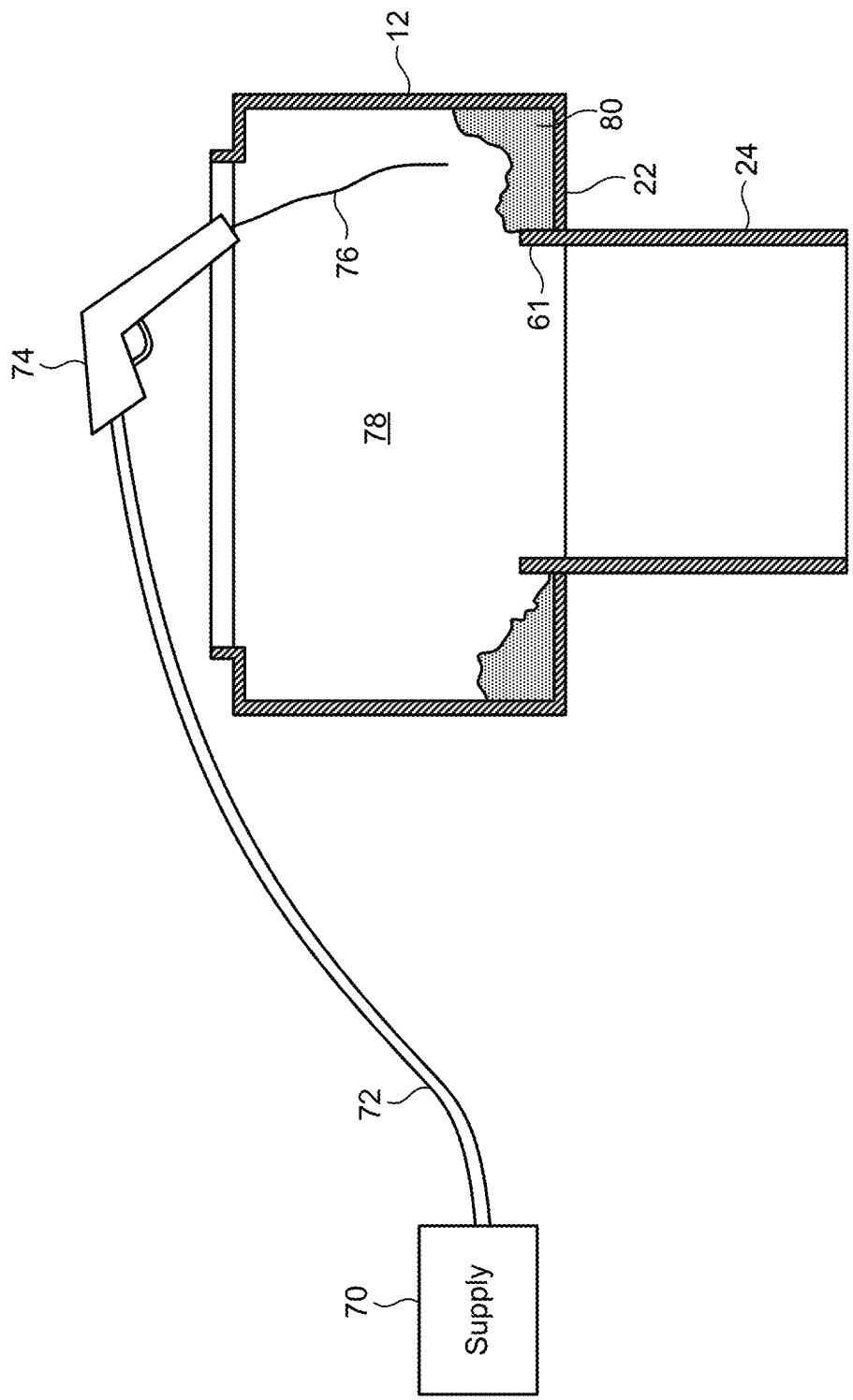
FIG. 5 shows an initial step in the process for forming an insulated register box of the present invention.

FIG. 5 shows an initial step in the process of the present invention. In FIG. 5, it can be seen that there is a supply of expandable polymeric material 70 that is connected by a conduit 72 to a foam gun 74. A pump can be used in association with the conduit 72 and/or the supply 70 in order to allow the gun 74 to spray the expandable polymeric material 76 into the body 12 of the register box. In particular, it can be seen that the expandable polymeric material 76 is generally introduced into a corner 80 between one of the side panels 14, 16, 18 and 20 and the back wall 22. The portion 61 of the duct 24 extends into the interior 78 of the body 12 so as to resist the flow of expandable polymeric material into the interior of the duct 24. The small amount of expandable polymeric material that is placed into the interior 78 of the body 12 will suitably expand so as to cover the necessary area in order to create the insulation shown in FIG. 4.

Figure 6:
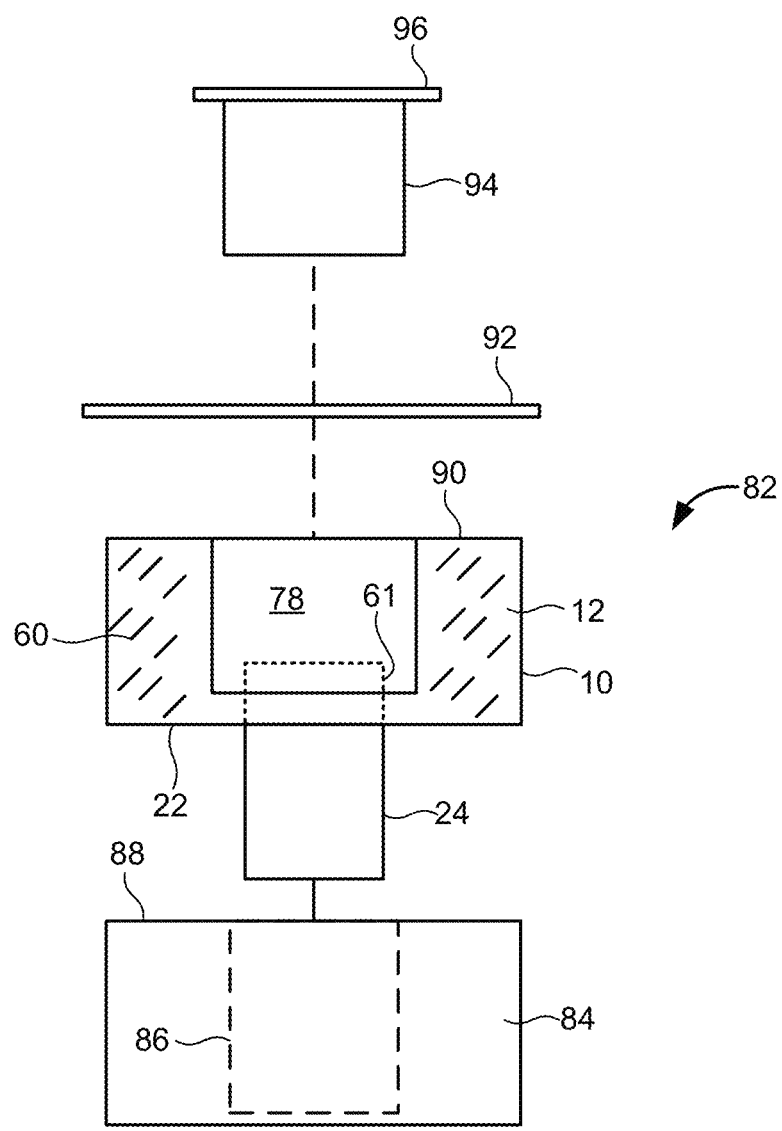
FIG. 6 is an exploded view showing the assembly of components used for the process for forming an insulated register box of the present invention.

FIG. 6 shows an exploded view showing an assembly 82 of the various components to be introduced into the conveyor system of the present invention. The assembly 82 includes the register box 10 having the duct 24 extending outwardly of the body 12. The duct 24 has portion 61 extending into the interior of the body 12. A support 84 is shown below the register box 10. The support 84 can be a metallic or wooden block that has a hole 86 formed therein. Hole 86 is sized and shaped so as to receive the duct 24 therein. The back wall 22 of the register box 10 will reside on the top side 88 of the support 84. As such, this provides a strong and steady support for the register box 10 during the processes of the present invention.

FIG. 6 shows that the interior 78 of the register box faces upwardly toward an end 90 opposite to the back wall 22. In order to form the insulation 60, initially, a plastic sheet 92 will be placed over the upper end 90 of the body 12. A plug 94 will then be inserted into the interior 78 of the body 12. After the plug 94 is inserted into the body 12, the plastic sheet 92 will envelop the exterior surface of the plug 94 so as to be interposed between the expandable polymeric material 60 and the exterior surface of the plug 94. In essence, this plastic sheet 92 provides a barrier so as to allow the plug 94 and sheet 92 to be easily removed after the expandable polymeric material 60 has cured. FIG. 6 further shows that the plug has a lip or ledge 96 that extends outwardly from the remainder of the body. This lip or ledge 96 will be placed over the upper end of the body and over that portion of the plastic sheet 92 that extends outwardly over this upper end 90 of the body 12 so as retain the plastic sheet 92 in position. Ultimately, this will create a sandwiched configuration which will allow the system of the present invention to allow the insulated register box to be properly formed.

The plug 94 has a gasket seal affixed to the bottom thereof. The gasket seal can be formed of a polymeric or elastomeric material. The gasket seal can be affixed to the bottom of the plug 94 by adhesives or by a variety of other means. The gasket seal will sealingly engage with the end of the portion 61 of duct 24 within the interior 78 of the register box 10. This tight sealing relationship will prevent the expandable polymeric material 60 from entering the interior of the duct 24. Since the plastic sheet 92 will be interposed between the gasket seal and the end of the portion 61 of duct 24, there will be no difficulty in separating the gasket seal from the duct 24 upon completion of the process.

The prevention of the expandable polymeric material from entering the interior of the duct 24 achieves a variety of advantages. Fundamentally, this presents a favorable and improved aesthetic appearance of the register box 10. The absence of expandable polymeric material from the interior of the duct 24 will improve the aerodynamic characteristics of the duct 24. The prevention of expandable polymeric material from entering the interior of the duct 24 reduces time and labor requirements associated with cleaning the interior of the duct upon completion of the register box 10. It also serves to reduce material consumption and provide a more uniform use of the expandable polymeric material. As such, greater uniformity of the creation of the expandable polymeric material 60 is achieved. Since the gasket seal serves to prevent intrusion of the expandable polymeric material 60 into the interior of the duct 24, there is no material loss into the interior of the duct 24. As such, the amount of expandable polymeric material introduced by the foam gun 74 can be uniform throughout the production process.

Figure 7:
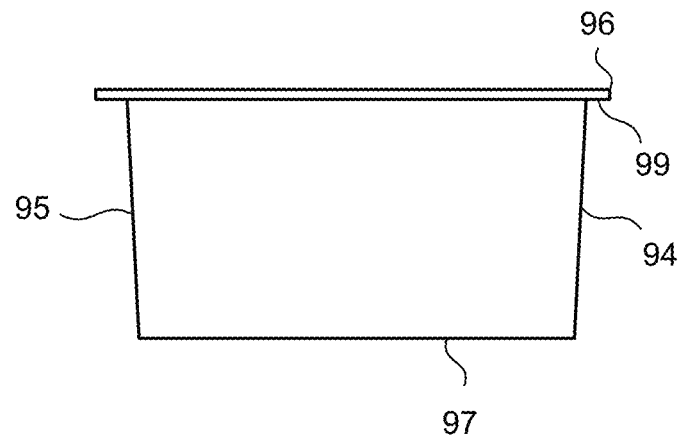
FIG. 7 is a side elevational view of the plug as used in the process for forming an insulated register box of the present invention.

FIG. 7 shows an end view of the plug 94. It can be seen that the plug 94 has a generally tapered outer surface 95. This tapered outer surface 95 will taper so as to narrow in diameter toward the bottom 97. Lip 96 is at the wide end of the tapered exterior surface 95 of the plug 94. The underside 99 of the lip 96 will bear against the plastic sheet 92 during the formation of the insulated register box 10 of the present invention. It can be can be seen that the gasket seal is affixed to the bottom 97 of the plug 94. The gasket seal extends entirely across the bottom 97 of the plug 94. As such, this provides a surface that can bear against the end of the duct within the interior of the register box 10.

Figure 8:
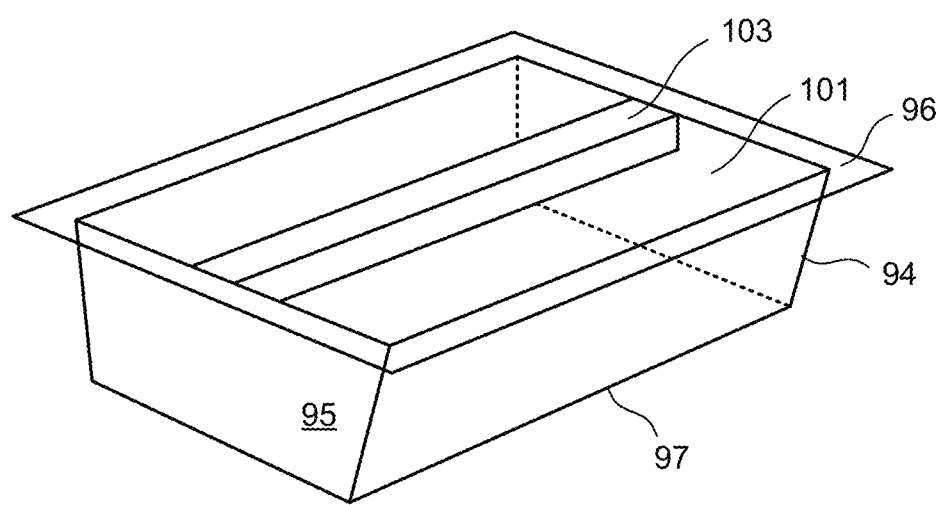
FIG. 8 is at the upper perspective view of the plug as used in the assembly of components of the process for forming an insulated register box of the present invention.

FIG. 8 is a perspective view showing the interior of the plug 94. As can be seen, plug 94 can be formed of an aluminum or steel material. The exterior surface 95 is illustrated as tapering downwardly toward the bottom 97. The interior 101 is hollow. Strut 103 extends across the hollow interior 101. Strut 103 enhances the structural integrity of the plug 94 and enhances the ability to manipulate the plug during installation and removal. The lip 96 extends outwardly around the perimeter of the plug 94 at the upper end of the plug 94. The strut 103 also facilitates the ability to remove the plug 94 from the assembled configuration once the insulating material is properly formed within the insulated register box 10. The gasket seal is extending across the length and the width of the plug 94. The gasket seal is affixed against the bottom 97 of the plug 94.

Figure 9:
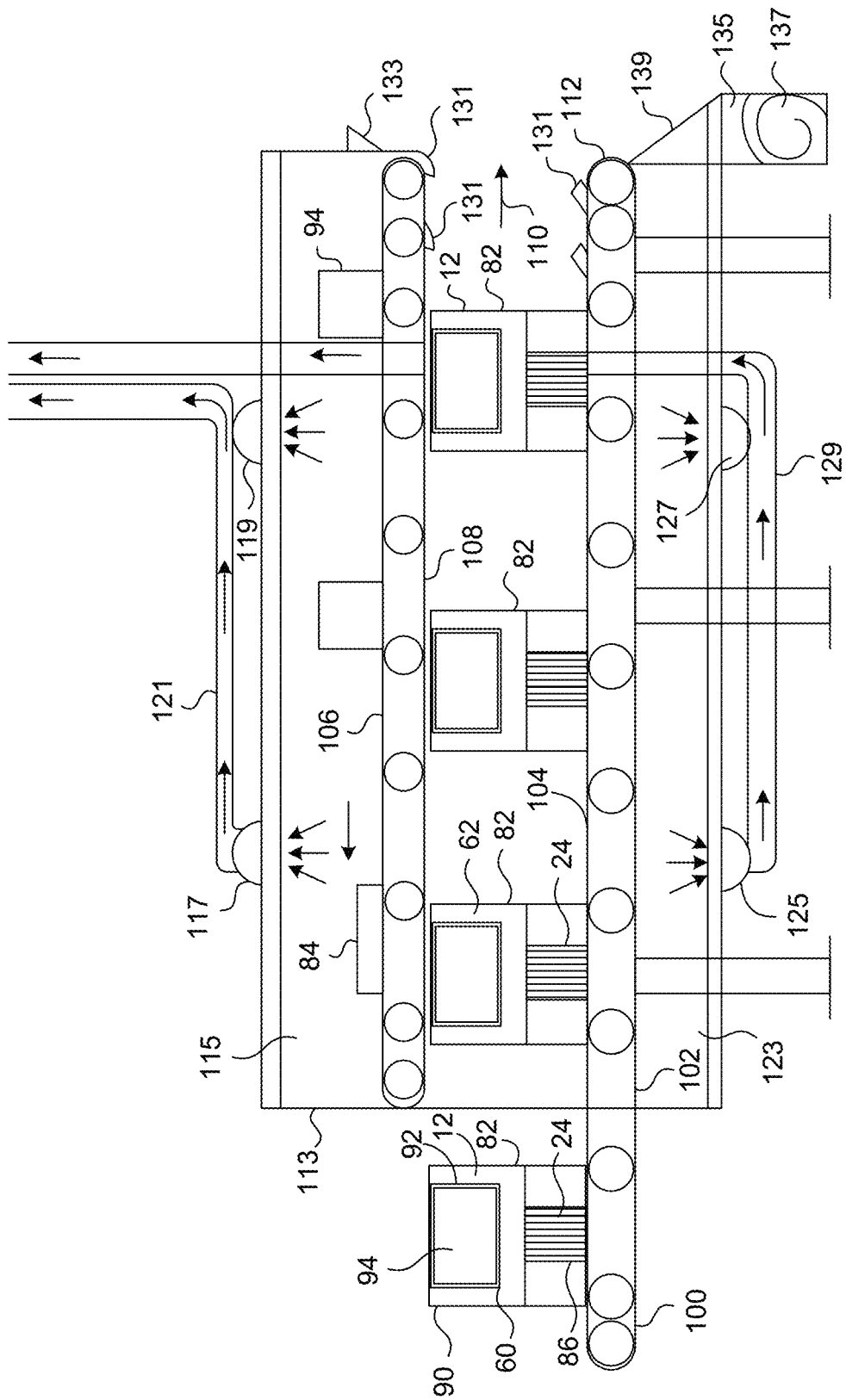
FIG. 9 is a side elevational view showing the process of forming an insulated register box of the present invention.

FIG. 9 shows the assembly 82 residing at an end 100 of a lower conveyor 102. As can be seen, the duct 24 is received in the hole 86 of the support 84. The plug 94 has been received in the interior 78 of the body 12. The plastic sheet 92 surrounds the exterior of the plug 94 and is interposed between the expandable polymeric material 60 and the exterior of the plug 94. The conveyor 102, as shown in FIG. 9, will cause the relatively rigid belt 104 thereon to move in a generally clockwise manner. As such, the assembly 82 will move from the position at the end 100 of the conveyor 102 to a position located between conveyor 102 and conveyor 106. Conveyor 102 has a length slightly longer than the length of the conveyor 106 so as to allow the placement of the plug 94 onto the assembly 92. Ultimately, the assembly 82 will enter the area between the conveyors 102 and 106. The rigid nature of the belt 104 of conveyor 102 and belt 108 of conveyor 106 will cause the plug 94 to compress against the end of portion 61 of the duct 24 and against the end 90 of the body 12. This compression will allow the expandable polymeric material 60 expand and cure. The tight relationship between the plug 94 and the end of the portion 61 of the duct 24 will prevent the expandable polymeric material 60 from entering the interior of the duct 24. This avoids those circumstances where the worker places the plug 94 too loosely onto the assembly such that expandable polymeric material leaks into the interior of the duct. Similarly, the tight relationship between the belt 108 and the plug 94 will cause plug 94 to always bear with constant force against the end 90 of the body 12 so as to prevent the expandable polymeric material 60 from escaping into the interior 78 of the body 12.

As can be seen in FIG. 9, the assembly 82 will continue to move along the conveyors 102 and 106 in a tightly compressed configuration. Ultimately, within the design of the present invention, the length of the conveyors 102 and 106 is configured so as to allow for a proper amount of curing time. In actuality, workers will continue to place separate assemblies 82 one after the other upon the conveyor 102 so that the process is a continuous process. The assemblies 82 will be spaced from one another throughout their travel with the conveyors 102 and 106. The arrow 110 illustrates the direction of movement of the assemblies 82 on the parallel conveyors.

It is important to note that the unique feature the present invention is that the belt 108 of conveyor 106 moves in a counter-clockwise direction. As such, when the assembly 82 reaches the end of travel between the conveyors 102 and 106, the assembly can be removed. As such, materials can be returned back to the end 100 for use by the worker. As can be seen in FIG. 9, when the assembly 82 reaches the end of travel, the plug 94 is removed from the interior of the body 12. This can be placed on the top of the belt 108 and returned back to the beginning of the conveyor. Similarly, the support 84 can also be placed on the belt 108 and returned back to the original position. As such, as the insulated register box is delivered to the opposite end 112 of the conveyors 102 and 106, the return action of the conveyor 106 will allow each of these components to be returned back to their original position without the need for stacking and transport. As a result, the insulated register box can be created in a simple and efficient manner. This minimizes the number of workers required for the production of such register boxes and also simplifies the labor requirements for such assembly.

In the process of the present invention, fumes are produced during the formation of the register boxes. As such, a housing 113 is positioned over the conveyors 102 and 106. There is an upper portion 115 of the housing 113 that has openings 117 and 119 opening to the interior of portion 115. A pipe 121 is connected to the openings 117 and 119. Ultimately, a vacuum is applied to the interior of the pipe 121 so as to create a section on the interior of the portion 115 of housing 113. As such, gases will escape from the interior of portion 115 by virtue of this vacuum suction. Similarly, another portion 123 of the housing 113 underlies the conveyor 104. Openings 125 and 127 serve to open to the interior of portion 123. Openings 125 and 127 are connected to the pipe 129. Once again, a suction is applied to the pipe 129 so as to draw any vapors from the interior of the portion 123 of housing 113. The suction facilitates drying and curing of the expandable polymeric material. This action is shown by the arrows in fit in FIG. 9.

On occasion, foam and debris 131 may form on the lower surface of the conveyor 106. To remove this foam and debris 131, a scraper 133 is affixed to the housing 113 at the end of the conveyor 106. Scraper 133 will separate the foam and debris 131 such that the foam and debris can fall downwardly and be received within a receptacle 135 therebelow. Receptacle 135 can contain an auger conveyor 137 so as to transport the separated foam and debris to a remote location. Similarly, conveyor 104 also can have debris 131 on the upper surface thereof. Another scraper 139 is affixed to the housing 113 that adjacent to the end of the conveyor 104. Scraper 139 will once again separate the foam and debris 131 from the conveyor 104 such that the foam and debris 131 falls downwardly into the receptacle 139. This foam and debris is then transported to into the receptacle 135 and then transported by the auger conveyor 137 to a remote location.

Figure 10:
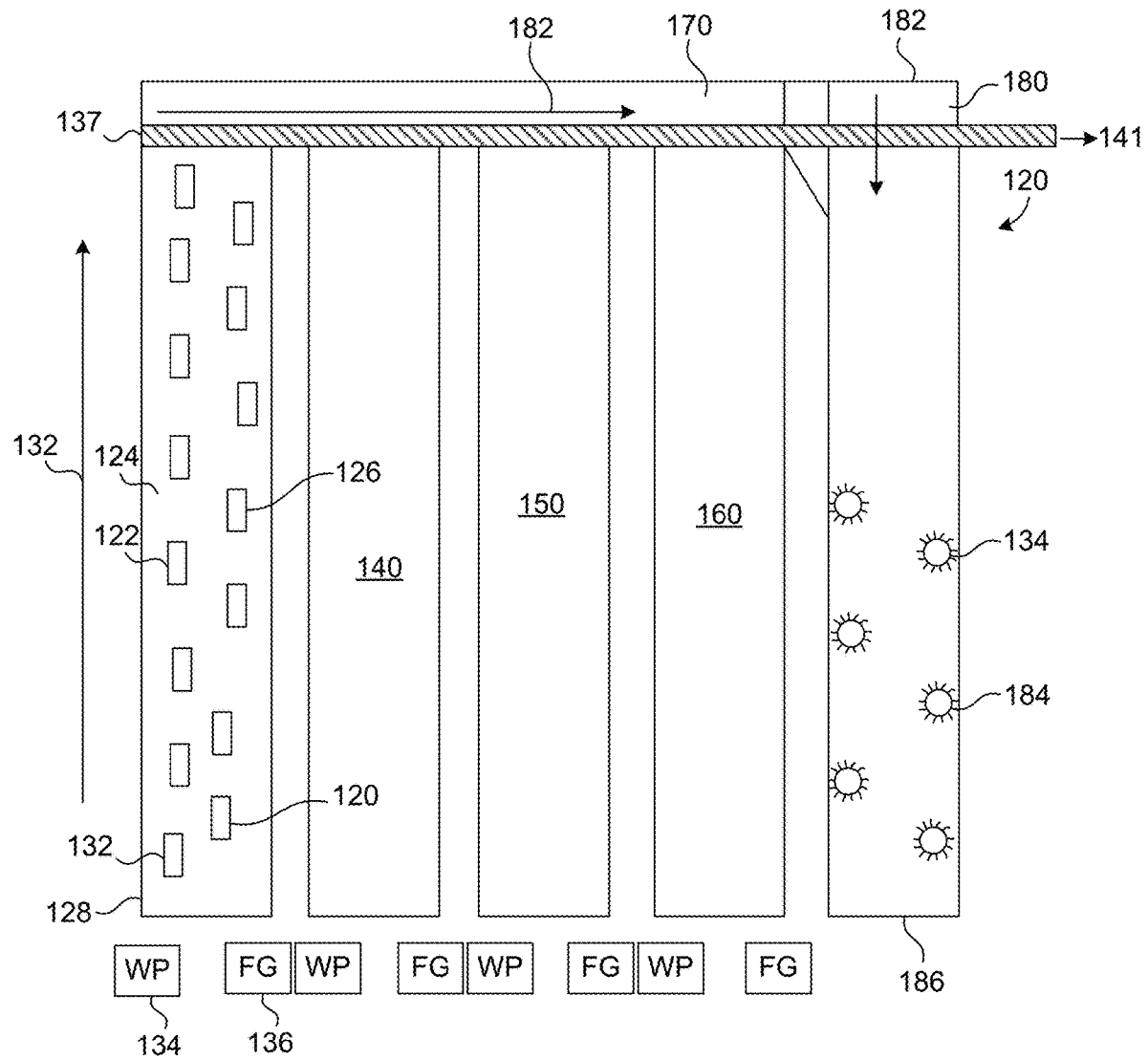
FIG. 10 is a plan view showing the overall process for forming insulated register box of the present invention.

FIG. 10 shows a plan view of a conveyor 124 of the assembly of register boxes of the present invention. As can be seen in FIG. 10, the various register boxes 122 are arranged in spaced relationship upon the conveyor 124. In actual operation, the register boxes 122 will be placed in staggered relation to register boxes 126. As such, there are two rows in staggered relation that move from end 128 to an opposite end of the conveyor 124. Each of the register boxes 122 and 126 is configured in the manner shown by the assembly 82 of FIG. 6. The staggering of the register boxes allows for ease of travel from end 128 to end 130 and such that the conveyor belts will can distribute an even and constant amount of pressure across the surfaces of the assemblies. Arrow 132 illustrates the direction of travel of these register boxes.

In FIG. 10, it can be seen that there is a work pallet 134 and a foam gun 136 positioned adjacent to the end 128 of the conveyor 124. As such, a worker can stand adjacent to the end 128 of the conveyor 124 and have an arrangement of the formed register boxes at one side on the work pallet 134 and the foam gun at the other side. Typically, the work pallet 134 will have a stack of the fabricated register boxes. The foam gun 136 allows the worker to begin the initial step of introducing the expandable polymeric material into the interior of the register box. As such, a single worker will have all of the tools necessary at his or her location adjacent to the end 128 of conveyor 124 so as to carry out the formation of the insulated register box of the present invention.

FIG. 10 shows that the ability to produce register boxes enhanced by the ability to have additional conveyors 140, 150 and 160 in side-by-side relationship. As such, each of these conveyors 124, 140, 150 and 160 can be used for additional production of insulated register boxes. Under those circumstances where demand is great and greater production is required, all of the conveyors 124, 140, 150 and 160 can be used. Under reduced demand and lower production requirements, only one or a few of such conveyors need to be used. Each of the conveyors 124, 140, 150 and 160 will have an identical construction. As such, the workers will be adjacent to each other at the ends of the respective conveyors.

Each of the conveyors 124, 140, 150 and 160 will have their ends delivering product to transverse conveyor 170. The transverse conveyor will deliver product from the end of conveyor 124 toward the cleaning conveyor 180. Arrow 182 illustrates the direction of movement of the various insulated register boxes exiting the particular conveyors. FIG. 10 also shows the auger conveyor 137. Auger conveyor 137 serves to receive the foam and debris 131 from each of the conveyors 104 and 106. The auger conveyor 137 will also receive the foam and debris from the conveyors 140, 150 and 160. The auger conveyor 137 will then transport the foam and debris to a remote location 141. A suitable siphon collector can be located at the remote location so as to suction the foam and debris from the surfaces of the auger conveyor 137. As such, the conveyors will remain clean throughout their continuous use.

A worker will reside at end 182 of the conveyor 180. As such, the arrangement and order of insulated register boxes being delivered to the transverse conveyor 170 is not important. Ultimately, these insulated register boxes will funnel in the direction toward the surface of the conveyor 180. The worker at the end 182 will invert each of the register boxes so that the duct resides at the top of the insulated register box. It can then move along the cleaning conveyor 180 to brushes 184. Brushes 184 are configured so as to clean the exterior surface of the duct. It was found that many customers preferred ducts that do not have expandable polymeric material on the exterior thereof. The appearance of such expandable polymeric material on the exterior of the duct can inhibit the ability to join the duct to the HVAC system. As such, this cleaning step is necessary so as to assure that the exterior surface of the duct is particularly clean. Ultimately, the cleaned insulated register boxes will exit the process of the present invention at the end 186 of the cleaning conveyor 180.

Figure 11:
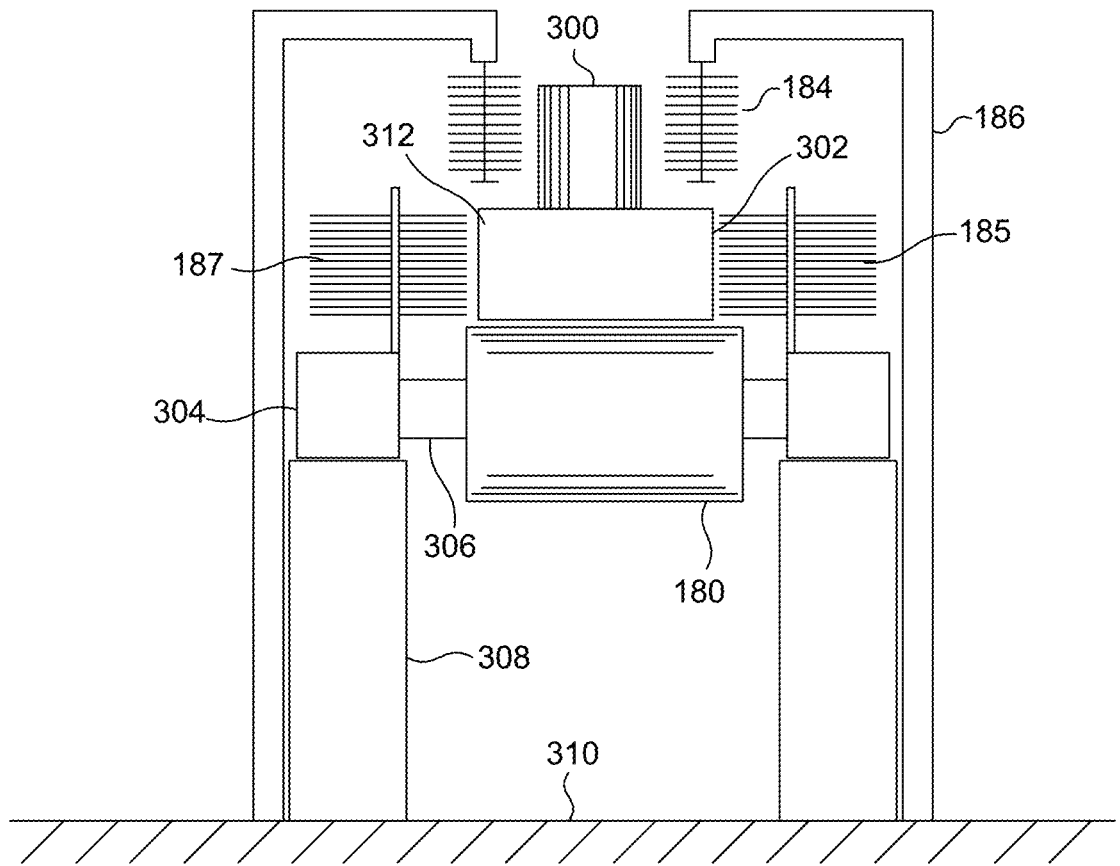
FIG. 11 is an end view showing the cleaning step in the process for forming an insulated register box of the present invention.

FIG. 11 illustrates the configuration of the brushes used for the cleaning of the duct 300 of register box 302. In particular, it can be seen that the cleaning brushes 184 are supported by frame 186 above the cleaning conveyor 180. The cleaning brushes 184 can be suitably motorized so as to rotate for the proper cleaning of the duct 300. Alternatively, the motion of the insulated register box 302 on the cleaning conveyor 180 can create enough motion out of stationary cleaning brushes 184 to effectively remove the expandable polymeric material from the exterior of the duct 300. It can also be seen that there are also cleaning brushes 185 and 187 located on opposite sides of the body of the insulated register box 302. As such, while the cleaning brushes 184 serve to clean the exterior surfaces of the duct 300, cleaning brushes 185 and 187 serve to clean the exterior surfaces of the body of the insulated register box 302. As such, the process of the present invention from provides a clean and debris free register box.

FIG. 11 also shows that there is a motor 304 associated with a shaft 306 that can drive the movement of the cleaning conveyor 180. The shaft 306 and the motor 304 supported by structure 308 above an underlying surface 310. Similar mechanisms can be used in association with the various conveyors described herein previously. The support of the cleaning brushes 184 to the side of and above the cleaning conveyor 180 avoids any interference with the proper motion of the cleaning conveyor 180 and avoids any interference with the movement of the body 312 of the insulated register box 302.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A process for forming an insulated register box, the insulated register box having a body with a plurality of side panels and a back wall, the insulated register box having a duct extending through an opening in the back wall, the process comprising:
    (a) introducing an expandable polymeric material into an interior of the body;
    (b) placing the body onto a support;
    (c) positioning a plug into the interior of said body such that the expandable polymeric material expands between the back wall and the plurality of side panels and the plug;
    (d) positioning the support and the body between a pair of conveyors adjacent one end of the pair of conveyors such that the pair of conveyors holds the body and the duct and the expandable polymeric material tightly sandwiched therebetween;
    (e) conveying the body, the duct, the expandable polymeric material and the support to another position adjacent an opposite end of the pair of conveyors;
    (f) removing the support, the duct, the body, the expandable polymeric material, and the plug from the pair of conveyors; and
    (g) separating the plug from the body and the expandable polymeric material.

2. The process of claim 1, the duct being welded to the back wall of the body such that the duct has a portion extending into an interior of the body, the step of introducing the expandable polymeric material comprising:
    introducing the expandable polymeric material into the interior of the body in a location between the portion of the duct and at least one of the plurality of side panels.

3. The process of claim 2, the step of introducing comprising:
    spraying the expandable polymeric material from a foam gun to the interior of the body, the foam gun being connected to a supply of the expandable polymeric material.

4. The process of claim 1, the support being a block having a hole formed at a top side thereof, the step of placing the body onto the support comprising:
    inserting the duct into the hole of the block, the back wall of the body residing on the top side of the block.

5. The process of claim 1, further comprising:
    positioning a plastic sheet over the end of the body opposite the back wall, the plastic sheet being interposed between the plug and the expandable polymeric material.

6. The process of claim 5, the step of separating further comprising:
    lifting the plastic sheet from the expandable polymeric material so as to define a cavity on the interior of the body, the cavity communicating with an interior of the duct.

7. The process of claim 1, further comprising:
    placing the plug on a top of one of the pair of conveyors such that the plug returns to the one end of the pair of conveyors.

8. The process of claim 7, further comprising:
    placing the support on the top of the one of the pair of conveyors such that the support returns to the one end of the pair of conveyors.

9. The process of claim 1, further comprising:
    curing the expandable polymeric material as the support, the duct and the body move along the pair of conveyors to the another position.

10. The process of claim 1, further comprising:
    placing the duct and the body and the expandable polymeric material onto a cleaning conveyor so as to clean at least some of the expandable polymeric material from an exterior of the duct.

11. The process of claim 10, the cleaning conveyor having a plurality of brushes supported thereon or adjacent thereto, the step of placing the duct and the body and the expandable polymeric material further comprising:
    placing the body onto the cleaning conveyor such that the duct extends upwardly from the body; and
    moving the cleaning conveyor such that the duct passes between the plurality of brushes.

12. The process of claim 11, further comprising:
    removing the duct and the body and the expandable polymeric material from an end of the cleaning conveyor.

13. The process of claim 11, the plurality of brushes being supported in a position in spaced relation to a top of the cleaning conveyor.

14. The process of claim 1, further comprising:
    forming a housing over an exterior of the pair of conveyors; and
    suctioning air from an interior of the housing in locations above and below the pair of conveyors.

15. The process of claim 1, further comprising:
    repeating steps (a)-(g) for another duct and body.

16. The process of claim 1, further comprising:
    scraping a surface of at least one of the pair of conveyors so as to remove foam or debris from the surface of the conveyor.

17. The process of claim 16, further comprising:
    discharging the scraped foam or debris from the conveyor downwardly into a receptacle, the receptacle having an auger conveyor therein; and
    augering the discharged foam and debris to a remote location.

18. The process of claim 1, the step of positioning the plug comprising:
    positioning the plug against an end of the duct interior of the body.

19. The process of claim 1, the plug having a lip extending outwardly of an upper end thereof, the step of conveying comprising:
    compressing the plug against the end of the body opposite the back wall such that the lip of the plug retains the expandable polymeric material within the interior of the body, the plug having a gasket seal at a bottom thereof that bears against the end of the duct so as to prevent the expandable polymeric material from entering the interior of the duct.

* * * * *